(12) United States Patent
Samson, Jr.

(10) Patent No.: US 7,531,811 B2
(45) Date of Patent: May 12, 2009

(54) HEMISPHERICAL RADIATION DETECTOR

(75) Inventor: John R. Samson, Jr., Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 36 days.

(21) Appl. No.: 11/742,682

(22) Filed: May 1, 2007

(65) Prior Publication Data

US 2008/0272308 A1  Nov. 6, 2008

(51) Int. Cl.
*G01T 3/00* (2006.01)
(52) U.S. Cl. .................................. 250/390.01
(58) Field of Classification Search ............. 250/390.01
See application file for complete search history.

(56) References Cited

U.S. PATENT DOCUMENTS

| | | | |
|---|---|---|---|
| 4,889,409 A | 12/1989 | Atcheson | |
| 6,046,454 A | 4/2000 | Lingren et al. | |
| 6,175,120 B1 * | 1/2001 | McGregor et al. | 250/370.13 |
| 6,333,504 B1 | 12/2001 | Lingren et al. | |
| 6,495,837 B2 * | 12/2002 | Odom et al. | 250/390.11 |
| 2002/0079456 A1 | 6/2002 | Lingren et al. | |

* cited by examiner

*Primary Examiner*—Christine Sung
(74) *Attorney, Agent, or Firm*—Fogg & Powers LLC

(57) ABSTRACT

A detector is provided that includes a plurality of layered hemispherically shaped elements. Each element is configured to sense the detection of an event. The detector further includes a lead for each element. Each lead is configured to pass a detection signal when its associate element detects an event.

20 Claims, 3 Drawing Sheets

HEMISPHERICAL RADIATION DETECTOR

BACKGROUND

Many space and missile applications require/desire real-time sensing and response to the current radiation environment, both natural and man-made. Real-time radiation environment sensing is accomplished with radiation detectors, single-threshold PIN diodes for man-made radiation environments and linearly-stacked detection elements for the natural radiation environment. The natural radiation environment comprises particles of a variety of species, particles of widely varying energies, and particles arriving from all directions. The requirement for characterizing the natural radiation environment for particles includes radiation detectors that can measure the rate of arrival and the energy level of arriving protons, ions, electrons and neutrons.

Most systems concerned about sensing their radiation environment require or desire, at least, hemispherical coverage of the environment. Current radiation detectors for the natural radiation environment are made with linearly-stacked detector elements. The physical arrangement of the linearly-stacked detector elements limits the Field of View (FOV) of the detector, hence limiting its ability to detect particles arriving from directions other than those within the narrow FOV. Providing hemispherical coverage with traditional linearly-stacked detectors requires a multitude of detectors pointing in "all" directions. The use of a multitude of detectors to achieve hemispherical coverage is costly and presents a number of mechanical packaging problems.

For the reasons stated above and for other reasons stated below which will become apparent to those skilled in the art upon reading and understanding the present specification, there is a need in the art for an effective and efficient hemispherical radiation detector.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a detector is provided. The detector includes a plurality of layered hemispherically shaped elements. Each element is configured to sense the detection of an event. The detector further includes a lead for each element. Each lead is configured to pass a detection signal when its associate element detects an event.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
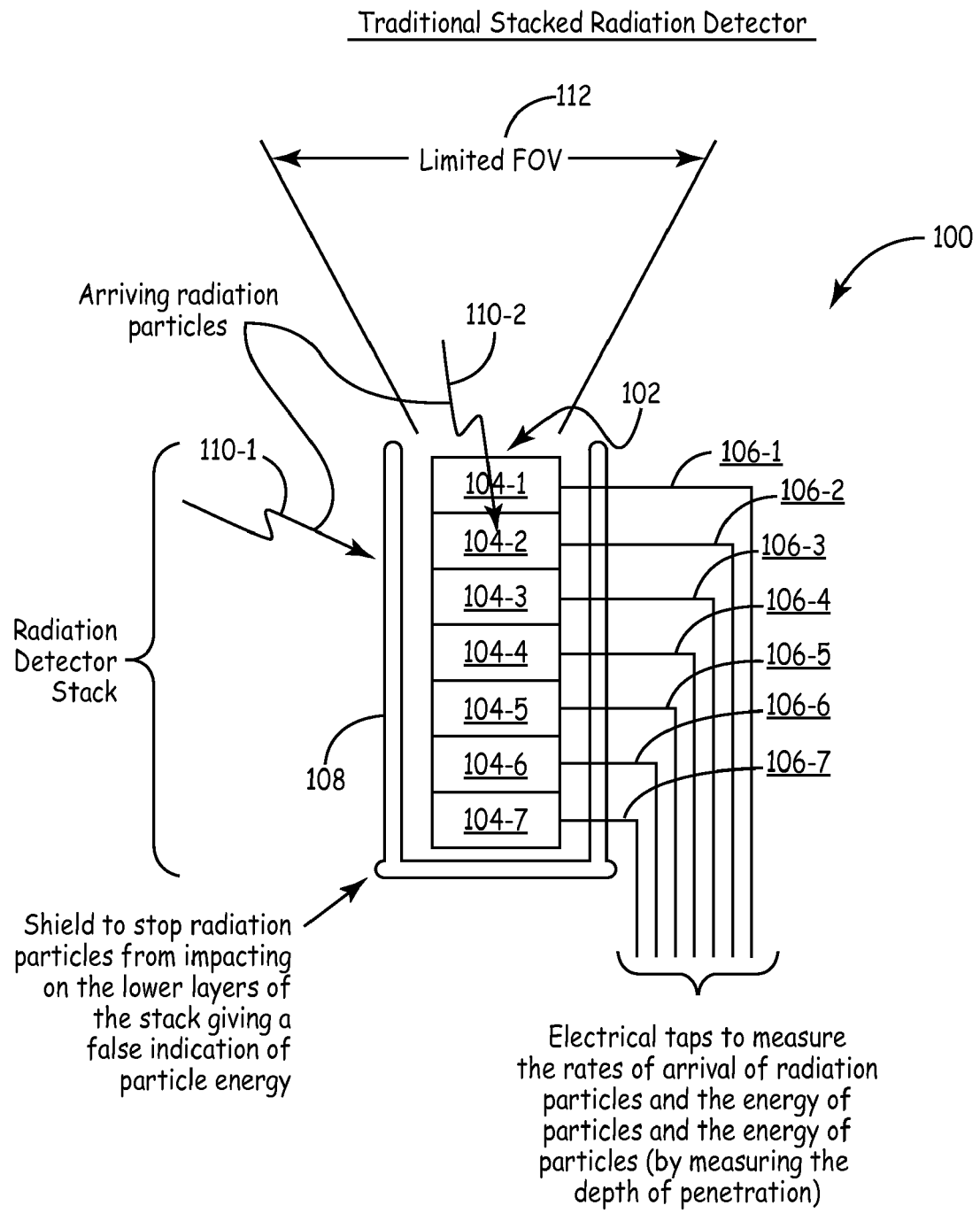
FIG. 1 is a side view of a stacked radiation detector of the prior art.

Embodiments of the present invention provide a hemispherical radiation detector wherein $2\pi$ Steradians of coverage is provided. To provide further background prior art FIG. 1 is shown. FIG. 1 illustrates a traditional stack radiation detector 100. The radiation detector 100 includes a plurality of linearly-stacked detector elements 104-1 through 104-7. Particles arriving at the radiation detector 100 that have sufficient energy to generate ionization and photocurrents are detected. Each detection element 104 in the stack 102 has an associated electrical lead 106-1 through 106-7 to pass a signal upon the arrival of a particle at its associated element 104. The energy of the particle is determined by how far the particle penetrates the stack 102. The deeper the particle penetrates the stack 102, the higher the energy. For example, radiation particle 110-2 reaches detector element 104-2. Accordingly, detection element 104-2 will generate a signal that is passed by associated lead 106-2.

The particle detection signals are fed to environmental adaptive control software which assesses the environment and configures the fault tolerant operation of the system to provide upset mitigation for the application commensurate with the sensed environment. The physical arrangement of the linearly-stacked detector elements 104 limits the Field of View (FOV) 112 of the detector, hence limiting its ability to detect particles arriving from directions other than those within the narrow FOV 112. This is due in part to shielding 108 placed around the stack 102 which inhibits incident particles directly striking the detector 100 lower in the stack 102 and giving a false indication of the incident particle's energy. An example of a particle hitting the shielding 108 is illustrated in FIG. 1 with regards to radiation particle 110-1. Providing hemispherical, i.e., $2\pi$ Steradian, coverage with traditional linearly-stacked detectors requires a multitude of detectors 100 pointing in "all" directions. The use of a multitude of detectors 100 to achieve hemispherical coverage is costly and presents a number of mechanical packaging problems.

Figure 2:
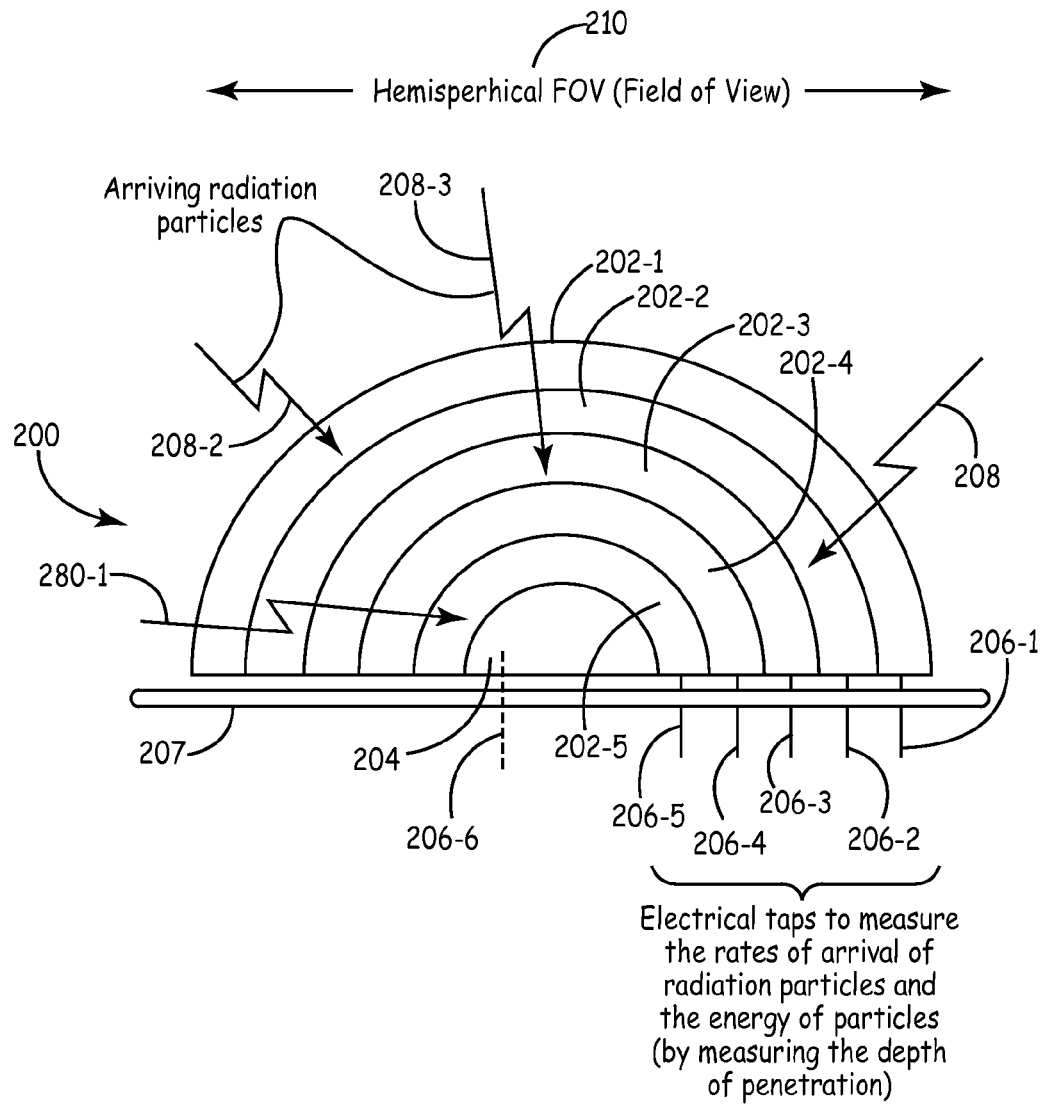
FIG. 2 is a cross-sectional side view of a radiation detector of one embodiment of the present invention.

Referring to FIG. 2 a cross-sectional side view of a radiation sensor 200 of one embodiment is illustrated. The radiation sensor 200 in this embodiment is domed shaped (or hemispherically shaped) to provide a hemispherical field of view (FOV) 210. The radiation sensor 200 includes a plurality of dome shaped layered detector elements 202-1 through 202-5. Associated electrical taps (or leads) 206-1 through 206-5 are coupled to associated elements 202 to pass signals that are used to measure the rates of the arrival of radiation particles 208-1 through 208-4 as well as the energy of the particles 208-1 through 208-4. For example, radiation particle 208-1 has more energy that radiation particle 208-2. In one embodiment, a central non-detector element (or central nub) 204 is used. In one embodiment, the nub is a hemispherically shaped seed. In another embodiment, the central nub 204 is another element 202 with an associated tap 206-6. Further illustrated in FIG. 2 is the shield 207 that prevents radiation particles from beyond the hemispherical field of view 210 from entering the elements 202 which would cause false readings in the elements 202. The leads 206 in this embodiment pass through the shield 207. The number of elements 202 in a sensor 200 or detector can vary depending on the application and the present invention is not limited to a select number of elements 202 in a detector 200.

In one embodiment, the radiation detector 200 is formed by ion beam implantation. In this embodiment, a formed semiconductor structure is doped with ion beam implantation techniques using varying energy levels to form elements 202-1 through 202-5 as illustrated in FIG. 2. In other embodiments, optical lithography/diffusion techniques may be used to form the radiation detector 200.

Figure 3:
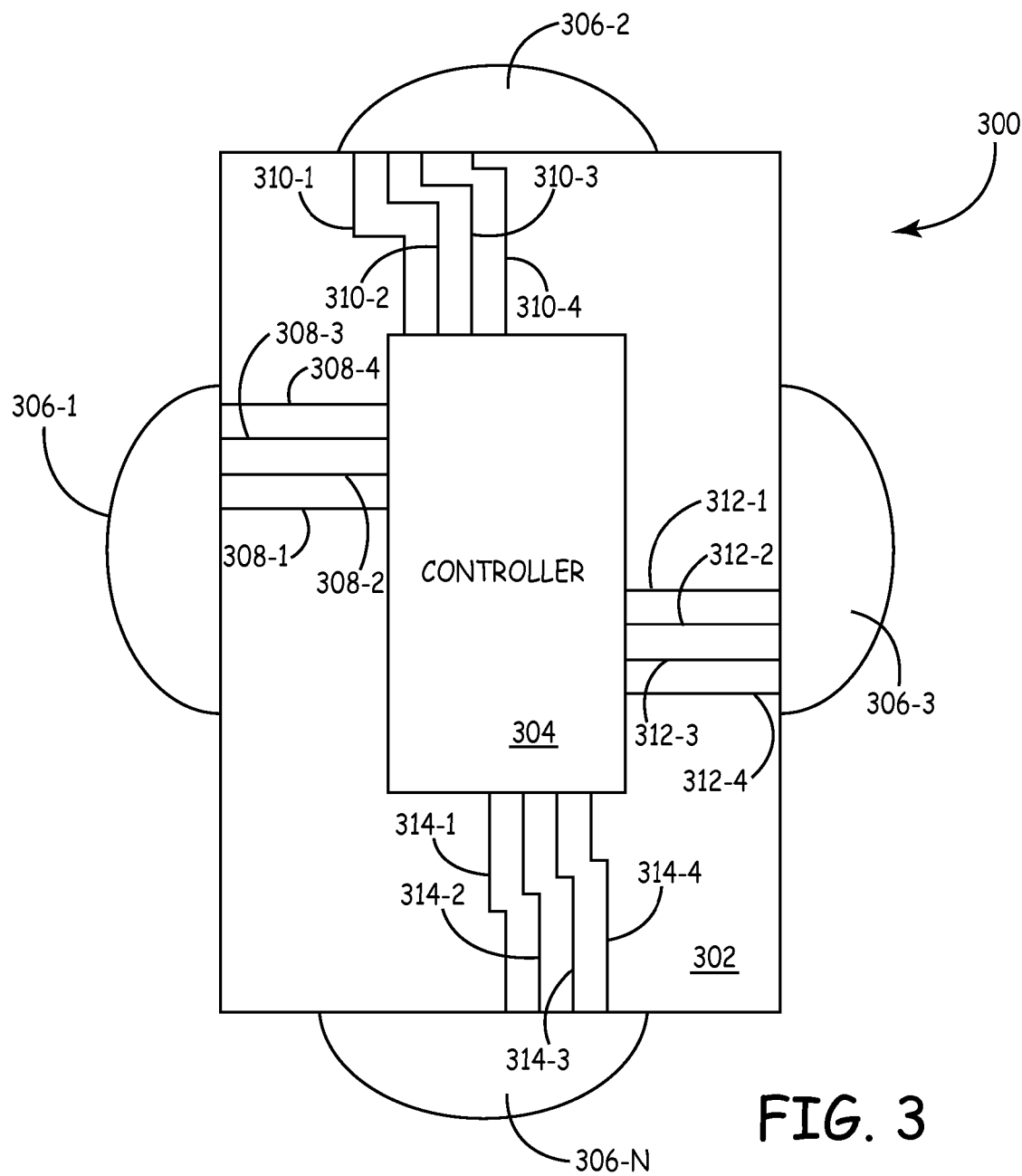
FIG. 3 is a radiation detection system of one embodiment of the present invention.

FIG. 3 illustrates a 2-dimensional view of a detection system 300 of one embodiment of the present invention. The addition of two more detectors in the orthogonal plane, i.e., coming out of and going into the plane of the page, guarantees full 3-dimensional coverage. The surfaces may be any shape, e.g., square or round. The detection system 100 is part of a device 302 that uses the detection of radiation for operations. An example of a device 302 is a missile, satellite or any other device needing to know the presence of radiation. Moreover the use of different doping in the fabrication of the detectors allows the same design to be used to detect protons, ions, electrons, neutrons and the like. This way a complete characterization of the environment around the device 302 can be determined. As FIG. 3 illustrates, a plurality of detectors 306-1 through 306-N can be used with a device 302.

Each of the detector 306 provides detection signals to a controller via leads 308, 310, 312, and 314 respectively. For example as illustrated in FIG. 3, detector 306-1 provides detection signals to the controller via leads 308-1 through 308-4. Each lead 308-1 through 308-4 is coupled to an associate element in the detector 306-1. Detector 306-2 provides detection signals to the controller via leads 310-1 through 310-4. Detector 306-3 provides detection signals to the controller via leads 312-1 through 312-4. Detector 306-N provides detection signals to the controller via leads 314-1 through 314-4. The controller 304 in one embodiment controls systems of the device in response to the detection signals. For example, in one embodiment, the controller 304 assesses the environment and configures a fault tolerant operation of the system to provide upset mitigation for an application commensurate with the sensed environment.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A detector comprising:
   a plurality of layered hemispherically shaped elements, each element configured to sense the detection of an event; and
   a lead for each element, each lead configured to pass a detection signal when its associate element detects an event.

2. The detector of claim 1, wherein the event is an arrival of a particle at the element.

3. The detector of claim 2, wherein the particle is at least one of a proton particle, ion particle, electron particle and a neutron particle.

4. The detector of claim 1, further comprising:
   a central nub, the plurality of layered hemispherically shaped elements overlaying the central nub.

5. The detector of claim 4, wherein the central nub is another element configured to sense the detection of an event.

6. The detector of claim 1, further comprising:
   a shield configured to block an event from providing a false reading.

7. The detector of claim 6, wherein the leads pass through the shield.

8. A radiation sensor comprising:
   a plurality of layered hemispherically shaped elements, each layer element configured to detect radiation particles; and
   a tap for each layer element to pass a detection signal when an associated layered element detects a radiation particle.

9. The radiation sensor of claim 8, further comprising:
   a central nub, the plurality of layered hemispherically shaped elements overlaying the central nub.

10. The radiation sensor of claim 9, wherein the central nub is another element configured to detect radiation particles.

11. The radiation sensor of claim 8, further comprising:
    a shield positioned to block radiation particles from providing false readings.

12. The radiation sensor of claim 11, wherein the taps pass through the shield.

13. A sensor system, the system comprising:
    at least one sensor having layered hemispherically shaped elements, each element configured to detect a particle;
    a lead for each element in each sensor, each lead configured to pass a detection signal when an associated element detects a particle; and
    a controller in communication with each lead, the controller configured to process detection signals.

14. The system of claim 13, wherein the particle is at least one of a proton particle, ion particle, electron particle and a neutron particle.

15. The system of claim 13, wherein the controller is configured to determine the energy of a particle by monitoring the depth upon which a particle travels through the layered hemispherically shaped elements via the detection signals in the respective leads.

16. The system of claim 13, wherein the controller is configured to adjust the operation of a vehicle based on the detected signals.

17. The system of claim 13, further comprising:
    a central nub, the plurality of layered hemispherically shaped elements overlyaing the central nub.

18. The system of claim 17, further comprising:
    the central nub being another element configured to detect a particle; and
    a central lead to pass a detection signal when the central nub detects a particle.

19. The system of claim 13, further comprising:
    a shield configured to block an event from providing a false reading.

20. The system of claim 19, wherein the leads pass through the shield.

* * * * *